United States Patent
Takahashi et al.

(10) Patent No.: US 6,536,390 B2
(45) Date of Patent: Mar. 25, 2003

(54) VARIABLE VALVE-TIMING ENGINE

(75) Inventors: Shunji Takahashi, Saitama (JP); Toru Wada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/106,450

(22) Filed: Mar. 27, 2002

(65) Prior Publication Data

US 2002/0139331 A1 Oct. 3, 2002

(30) Foreign Application Priority Data

Mar. 27, 2001 (JP) ........................................ 2001-090045

(51) Int. Cl.⁷ ................................................. F01L 1/34
(52) U.S. Cl. ............................... 123/90.15; 123/90.17; 123/90.16; 123/90.27; 123/90.31; 123/90.33; 123/90.34
(58) Field of Search ........................... 123/90.15, 90.16, 123/90.17, 90.27, 90.31, 90.33, 90.34

(56) References Cited

U.S. PATENT DOCUMENTS

| | | | | |
|---|---|---|---|---|
| 5,626,108 A | * | 5/1997 | Kato et al. ............... | 123/90.15 |
| 5,628,286 A | * | 5/1997 | Kato et al. ............... | 123/90.15 |
| 5,715,779 A | * | 2/1998 | Kato et al. ............... | 123/90.15 |
| 5,797,363 A | * | 8/1998 | Nakamura ............... | 123/90.17 |
| 6,213,069 B1 | * | 4/2001 | Wada et al. ............. | 123/90.15 |
| 6,330,869 B1 | * | 12/2001 | Yoshiki et al. ........... | 123/90.15 |
| 6,330,870 B1 | * | 12/2001 | Inoue et al. ............. | 123/90.17 |

FOREIGN PATENT DOCUMENTS

JP         2000-320358          11/2000

OTHER PUBLICATIONS

Yoshiki et al., A Control Device of an Internal Combustion Engine, European Patent Application, EP 1 052 378 A2, Nov. 15, 2000.*

* cited by examiner

Primary Examiner—Thomas Denion
Assistant Examiner—Ching Chang
(74) Attorney, Agent, or Firm—Armstrong, Westerman & Hattori, LLP.

(57) ABSTRACT

A variable valve-timing engine includes a VTC for adjusting a relative phase angle of an exhaust cam for opening and closing an exhaust valve and an intake cam for opening and closing an intake valve; an oil pressure controlling unit for operating the VTC; a deterioration detecting unit for detecting the deterioration of hydraulic fluid in the oil pressure controlling unit; a correcting unit for correcting the oil pressure of hydraulic fluid of the oil pressure controlling unit based on a detected value by the deterioration detection unit, and a deterioration indicating unit for indicating a replacement of the hydraulic fluid based on the detected value of the deterioration detecting unit, so that the user can be advised of a required oil replacement.

8 Claims, 8 Drawing Sheets

VARIABLE VALVE-TIMING ENGINE

BACKGROUND OF THE INVENTION

1. Field of the Invention

The present invention relates to a variable valve-timing engine having a variable valve timing mechanism (a phase angle adjusting unit) for adjusting a relative phase angle of an exhaust cam for opening and closing an exhaust valve and an intake cam for opening and closing an intake valve.

2. Description of the Related Art

In general, as a phase angle adjusting unit for adjusting a relative phase angle (a valve timing) of an exhaust cam for opening and closing an exhaust valve and an intake cam for opening and closing an intake valve, there are proposed a unit for adjusting the phase angle of an intake cam relative to an exhaust cam, which is disclosed in JP-A-2000-320358, a unit for altering the phase angle of an exhaust valve relative to an intake valve, a unit for implementing a selective change-over between a high-speed cam and a low-speed cam based on the engine speed, and a combination of any of the unit with a unit for adjusting the phase angle of an intake cam relative to an exhaust cam to thereby alter the phase angle of an intake cam to an exhaust cam.

In controlling a phase angle adjusting unit of the type as described above, an oil pressure control unit is used in order to improve the response in control, and a correction to a control value for the phase angle adjusting unit is implemented in response to deterioration in viscosity of a hydraulic fluid.

When the user replaces oil, however, since a correction value learnt just before the replacement of oil continues to be used as it is as the control value for the phase angle adjusting unit, there is caused a problem that the control value becomes out of order which is adopted by the oil pressure control unit to control the operation of the phase angle adjusting unit.

Furthermore, since there is provided no unit for warning the user of deterioration in hydraulic fluid and suggesting the user to replace the hydraulic fluid so deteriorated with fresh hydraulic fluid, it sometimes happens that the user replaces wastefully hydraulic fluid which does not need to be replaced, or conversely, the user continues to use hydraulic fluid which needs to be replaced.

In particular, there is caused a problem that developing deterioration in oil reduces the response in controlling the phase angle adjusting unit.

SUMMARY OF THE INVENTION

The present invention was made in view of these situations, and a primary object thereof is to implement the initialization of a correction value for a control oil pressure value adopted by the oil pressure controlling unit for proper operation when oil is replaced, and a secondary object thereof is to detect a timing at which oil has to be replaced and to make the user attempt to replace deteriorated oil with fresh one.

With a view to attaining the primary object of the invention, according to a first aspect of the invention, there is provided a variable valve-timing engine having a phase angle adjusting unit for adjusting a relative phase angle of an exhaust cam for opening and closing an exhaust valve and an intake cam for opening and closing an intake valve, an oil pressure controlling unit for controlling the operation of the phase angle adjusting unit through the oil pressure of hydraulic fluid, a correcting unit for correcting a control oil pressure value adopted by the oil pressure controlling unit to control the operation of the phase angle adjusting unit based on the degree of deterioration of the hydraulic fluid, and an oil replacement detection unit for detecting the replacement of the hydraulic fluid, wherein the correcting unit initializes a correction value for a control oil pressure value adopted by the oil pressure controlling unit to control the operation of the phase angle controlling unit immediately an oil replacement has been implemented, so that a preset initial value can be used.

Namely, in the event that a correction value for a control oil pressure value adopted by the oil pressure controlling unit to control the operation of the phase angle adjusting unit continues to be used as it is as an initial value, the oil pressure control value becomes unsuitable for the operation of the phase angle adjusting unit, leading to improper adjustment of the phase angle. However, in the event that the initial value is used in a manner as has been described above, the phase angle adjusting unit can be operated properly.

With a view to attaining the secondary object of the invention, according to a second aspect of the invention, there is provided a variable valve-timing engine having a phase angle adjusting unit for adjusting a relative phase angle of an exhaust cam for opening and closing an exhaust valve and an intake cam for opening and closing an intake valve, an oil pressure controlling unit for controlling the operation of the phase angle adjusting unit through the oil pressure of hydraulic fluid, a correcting unit for correcting a control oil pressure value adopted by the oil pressure controlling unit to control the operation of said phase angle adjusting unit based on the degree of deterioration of the hydraulic fluid, an oil replacement detection unit for detecting the replacement of the hydraulic fluid and a deterioration indicating unit for indicating the replacement of the hydraulic fluid, wherein the correcting unit initializes a correction value for a control oil pressure value adopted by the oil pressure controlling unit to control the operation of the phase angle controlling unit immediately an oil replacement has been implemented, so that a preset initial value can be used.

According to the configuration, since the hydraulic fluid is replaced according to the indication by the deterioration indicating unit, this allowing for the oil to be replaced at a proper timing, not only can the wasteful replace of oil by the user be prevented but also the reduction in response in controlling the phase angle adjusting unit can be prevented.

In addition, since a correction value for the control oil pressure adopted by the oil controlling unit to control the operation of the phase angle adjusting unit is initialized immediately the oil replacement has been implemented, so that a preset initial value, the phase angle adjusting unit can be operated properly.

According to a third aspect of the invention, there is provided a variable valve-timing engine as set forth in the first or second aspect of the invention, wherein the initial value is a correction value adopted after the oil pressure controlling unit and the phase angle adjusting unit have been run in.

In the event that a correction value obtained after the required running-in has been completed properly is used as an initial value, the phase angle adjusting unit is allowed to operate properly, and the response and reliability in controlling can be improved as much as possible.

DETAILED DESCRIPTION OF THE PREFERRED EMBODIMENTS

Referring to FIGS. 1 to 9, a mode for carrying out the invention will be described below.

Figure 1:
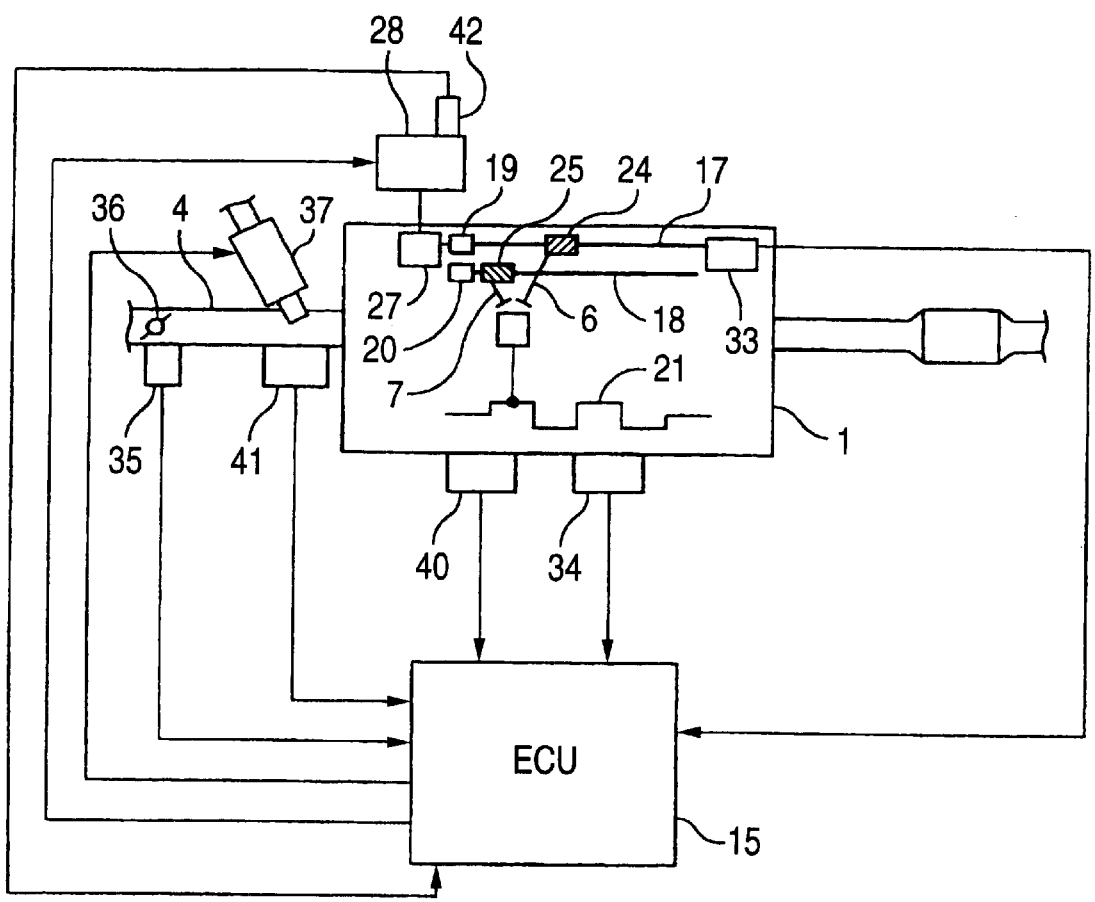
FIG. 1 is a system diagram of a four-cycle engine according to an embodiment of the invention, which is provided with a VTC (variable timing control)
Figure 2:
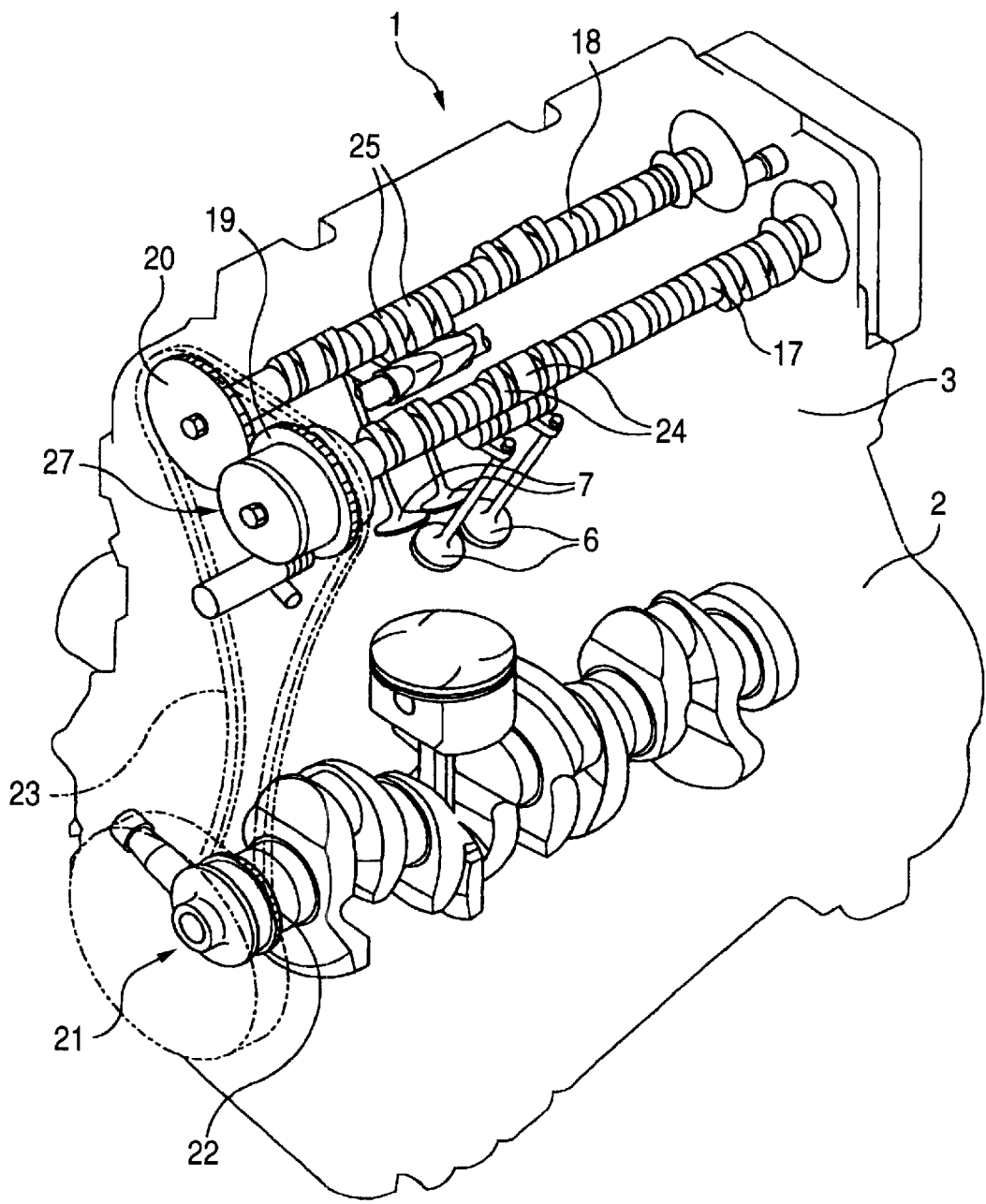
FIG. 2 is an explanatory view showing a drive line and a valve train of the engine according to the invention.

FIG. 1 is a system diagram for a four-cycle DOHC engine according to the invention, and FIG. 2 shows the constructions of a drive line and a valve train of the engine. In the figure, reference numeral 1 denotes an engine, reference numeral 2 a cylinder block and reference numeral 3 a cylinder head. In addition, intake valves 6 are mounted in intake ports (not shown) in such a manner as to open and close, and exhaust valves 7 are mounted in exhaust ports (not shown) in such a manner as to open and close.

As shown in detail in FIG. 2, an intake camshaft 17 and an exhaust camshaft 18 are provided in the cylinder head 3 of the engine 1. The both camshafts 17, 18 are connected to each other by an endless timing chain 23 extended to be wound around driven sprockets 19, 20 of the camshafts 17, 18 and a drive sprocket 22 of a crankshaft 21, whereby the both camshafts 17, 18 are driven to rotate once, respectively, while the crankshaft 21 rotates twice.

Pluralities of intake cams 24 and exhaust cams 25 for opening and closing the intake valves 6 and the exhaust valves 7, respectively, are provided on the intake camshaft 17 and the exhaust camshaft 18, respectively. With the intake camshaft 17, the relative rotational angle of the intake camshaft 17 relative to the driven sprocket 19 thereof can be changed, whereby the phase angle of the intake cams 24 relative to the crankshaft 21 can be changed.

In addition, a phase angle adjusting unit (hereinafter, referred to as VTC) 27 is mounted at an end portion of the intake camshaft 17 in order to make the intake camshaft 17 rotate relatively to the driven sprocket 19 to thereby change the phase angle of the intake cams 24 relative to the crankshaft 21.

Figure 3:
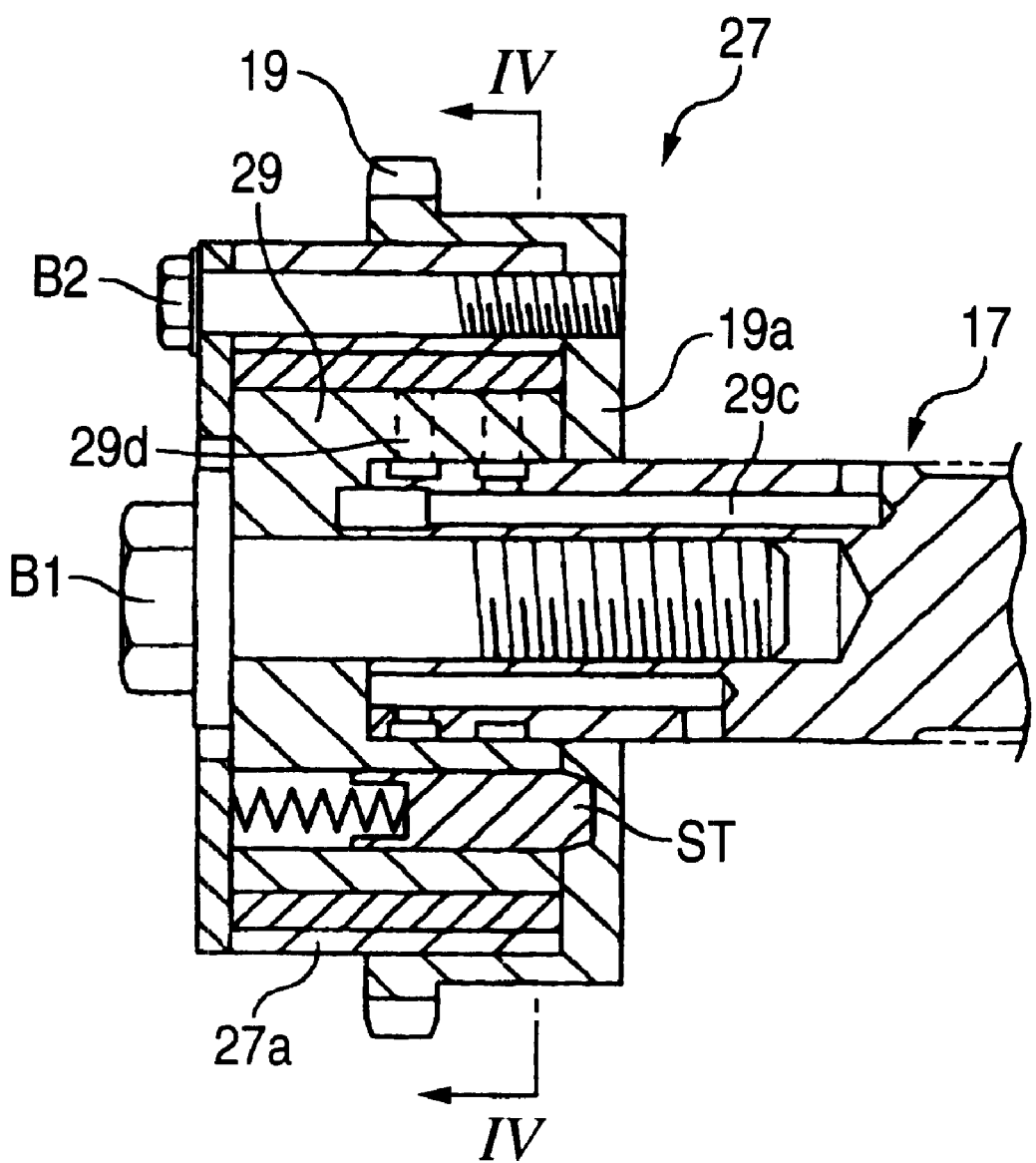
FIG. 3 is a detailed sectional view of a main part which shows the interior of the VTC according to the invention.
Figure 4:
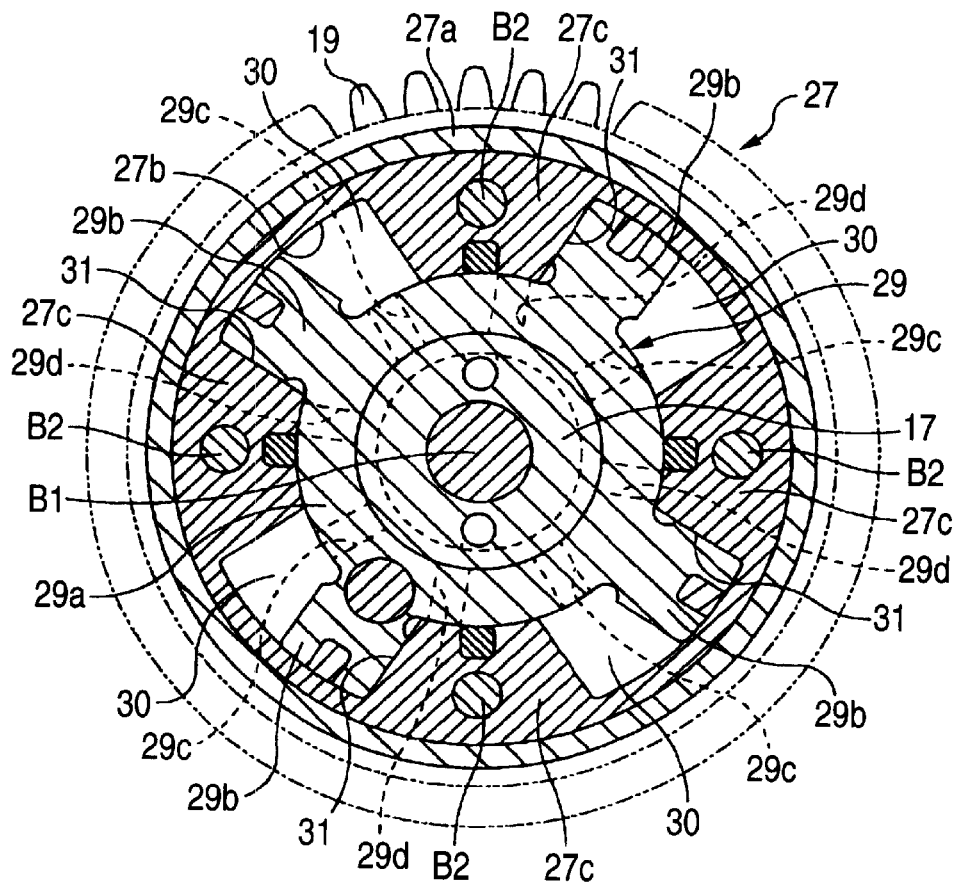
FIG. 4 is a sectional view taken along the line IV–IV of FIG. 3, which shows the construction of the VTC according to the invention.

FIG. 3 shows the interior of the VTC 27, and FIG. 4 shows a sectional view taken along the line IV–IV of FIG. 3. As shown in FIGS. 3 and 4, a vane (rotator) 29 for adjusting the phase angle of the intake camshaft 17 is accommodated in a housing 27a. The vane 29 is fixed to the one end portion of the intake camshaft 17 with a bolt B1, and the housing 27a is fixed to the driven sprocket 19 with bolts B2.

As shown in FIG. 4, a plurality of vane portions 29b are formed on a boss portion 29a of the vane 29 in such a manner as to protrude outwardly from an outer circumferential surface of the boss portion 29a. Partition walls 27c are formed in an inner circumferential wall 27b of the housing 27a so as to partition the interior of the housing 27a in a circumferential direction to thereby form a plurality of oil pressure chambers. Formed in the intake camshaft 17 and the boss portion 29a of the vane 29 are oil paths for selectively rotating the vane 29 via the vane portions 29b in an advance direction or a retard direction.

Figure 5:
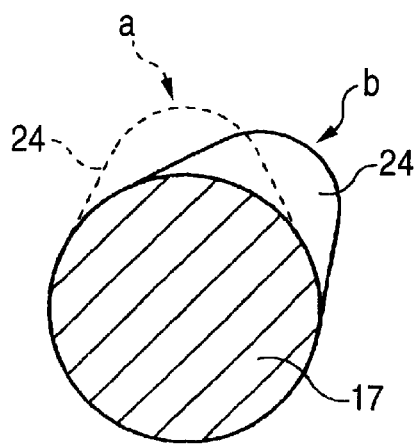
FIG. 5 is an explanatory view showing an adjustment of the phase angle of an intake camshaft according to the invention.

One of the oil paths functions as an advance oil path 29c for rotating the vane 29 to an advance side while the other oil path functions as a retard oil path 29d for rotating the vane in the retard direction, and the both oil paths are connected to an oil pump (not shown) via an oil pressure control valve (which will be described later) 28. According to this construction, with the vane 29 acting as a center, when a certain amount of hydraulic fluid is discharged from an oil chamber on a retard side (herein after referred to as a retard chamber) 31 while supplying the same amount of hydraulic fluid to an oil chamber on the advance side (hereinafter, referred to as an advance chamber) 30, the intake camshaft 17 rotates in the advance direction within a range defined by the adjacent partition walls 27c, 27c. Conversely, when a certain amount of hydraulic oil is discharged from the advance chamber 30 while supplying the same amount of hydraulic fluid to the retard chamber 31, the intake camshaft 17 rotates to the retard side within the range defined by the adjacent partition walls 27c, 27c. Due to this, as shown in FIG. 5, the intake cam 24 can be advanced from a retard position shown by a dotted line to an advance position shown by a solid line, or, can be retarded from the advance position to the retard position.

Note that in FIG. 3 reference character ST denotes a stopper for restricting the rotation of the vane 29 which stopper is designed to be released by virtue of oil pressure supplied through an oil path, not shown.

Figure 6:
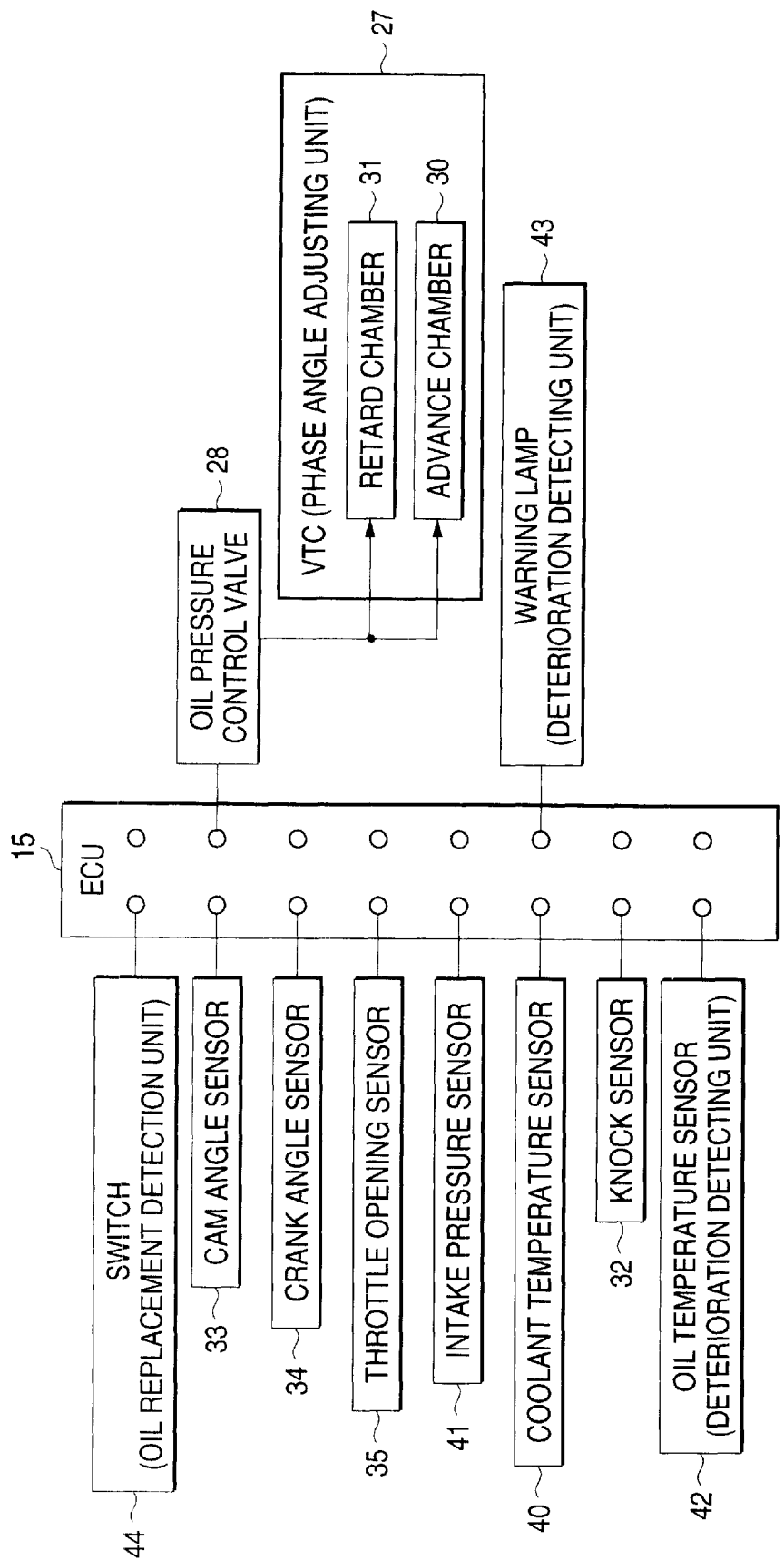
FIG. 6 is a block diagram showing a control system and a detection system according to the invention.

FIG. 6 shows a control system and a detection system of the engine 1. The oil pressure control valve 28 is constituted by a linear solenoid valve having a drive coil (not shown), a spool (not shown) driven by the drive coil and the like, wherein the position of the spool is changed according to an output duty ratio (an output control value) of electric current supplied to the drive coil from an ECU 15.

The oil pressure control valve 28 is constructed such that when an output duty ratio (an output control value) outputted from the ECU 15 is greater than a holding duty ratio (for example, 50%) the spool is moved from a neutral position to one side so as to open the advance chamber 30 whereas when the output duty ratio is smaller than the holding duty ratio the spool is moved from the neutral position to the other side so as to open the retard chamber 31.

Figure 7:
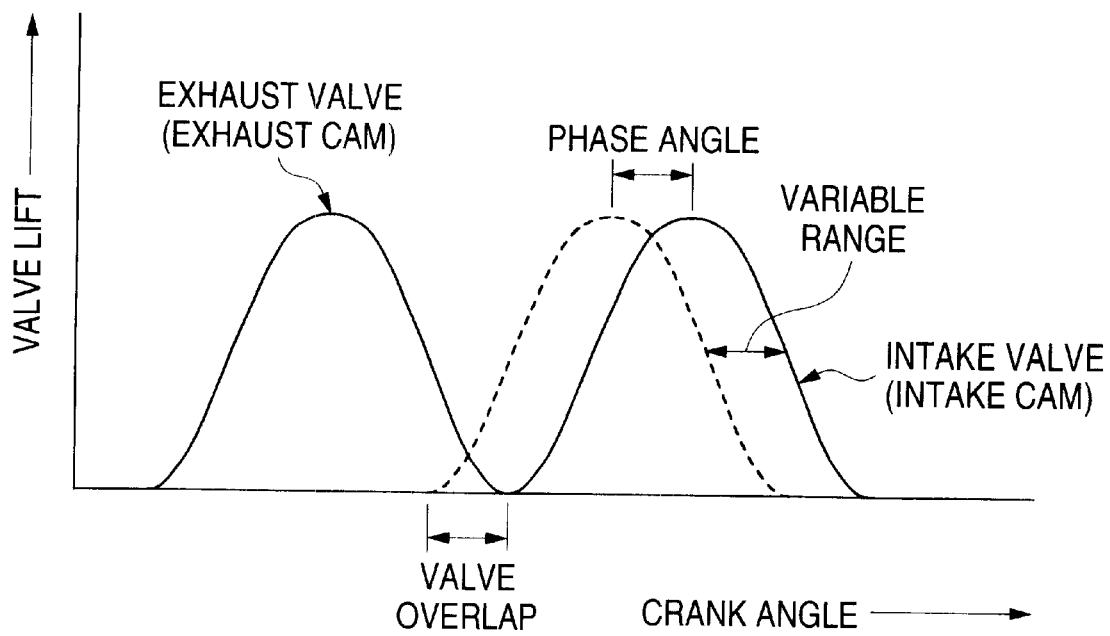
FIG. 7 is a diagram showing a relationship between phase angles of an intake cam and an exhaust cam according to the invention and valve lifts.

Due to this construction, when the output duty ratio (the output control value) is greater than the holding duty ratio (for example, 50%) the intake camshaft 17 rotates to the advance side by virtue of the pressure of hydraulic fluid supplied to the advance chamber 30, whereby as shown in FIG. 7, the phase angle of the input cam 24 relative to the exhaust cam 25 is advanced. Conversely, when the output duty ratio (the output control value) is smaller than the holding duty ratio (for example, 50%) the intake camshaft 17 rotates to the retard side by virtue of the pressure of hydraulic fluid supplied to the retard chamber 31, whereby the phase angle of the intake cam 24 relative to the exhaust cam 25 is retarded. In addition, when the output duty ratio equals to the holding duty ratio the spool is moved to the neutral position where both the advance chamber 30 and the retard chamber 31 are opened, whereby both the advance chamber 30 and the retard chamber 31 are closed and the supply of hydraulic fluid to both the advance chamber 30 and the retard chamber 31 are shut off, this allowing the intake camshaft 17 and the driven sprocket 19 to be made integral with each other, the phase angle of the intake camshaft 24 being thereby held at the controlled phase angle that has been effective until then.

As shown in FIG. 6, the ECU 15 as a controlling unit is constituted by a microprocessor mainly having an I/O, a CPU or MPU, a RAM, and a ROM (any of which is not shown) and includes an electric current detecting circuit (not shown) for detecting an actual electric current value of electric current supplied to the drive coil of the oil pressure control valve 28, an A/D converter for A/D converting signals from various sensors and a waveform rectifier for rectifying a waveform.

In addition, connected to the ECU 15 are a knock sensor 32, a cam angle sensor 33 for detecting the angle of a cam, a crank angle sensor 34 for detecting the angle of a crank, a throttle opening sensor 35 for detecting the throttle opening, a coolant temperature sensor 40 for detecting the temperature of coolant, an intake pressure sensor 41 for detecting the amount of intake air, an oil temperature sensor (a deterioration detecting unit) 42 for detecting the temperature of hydraulic fluid, and an $O_2$ sensor (not shown) for detecting the air/fuel ratio. On top of these sensors, connected to the ECU 15 is a switch (an oil replacement timing detecting unit) 44 for detecting whether or not an oil replacement has been implemented by the user.

The cam angle sensor 33 is a sensor for detecting the phase angle of the intake cam 24 and is constituted by, for example, a magnet sensor and an MRE pick-up (a magnetic pick-up) and is designed to output a cam pulse to the ECU 15 every time a predetermined crank angle (for example, 180 degrees) is reached as the intake camshaft 17 rotates.

The crank angle sensor 34 is constructed similarly to the cam angle sensor 33 and is designed to output a crank pulse to the ECU 15 every time a predetermined crank angle (for example, 30 degrees) is reached as a crankshaft 21 rotates. In addition, the crank angle sensor 34 detects additional teeth as a reference and outputs a reference pulse to the ECU 15 once every time the crankshaft 21 completes a full rotation. The coolant temperature sensor 40 detects the temperature of coolant circulating between a radiator (not shown) and water jackets (not shown) of the engine 1 and outputs the temperature so detected to the ECU 15. The throttle opening sensor 35 detects the throttle opening of a throttle sensor valve 36, and the intake pressure sensor 41 detects the absolute pressure within an induction pipe 4 (refer to FIG. 1). The results of the detection by these sensors are also outputted to the ECU 15, respectively.

The ECU 15 calculates a phase angle of the intake cam 24 from a crank pulse and a cam pulse outputted from the crank angle sensor 34 and the cam angle sensor 33, respectively, and obtains an engine speed Ne and an intake air volume from the crank pulse and the intake pressure so as to implement a control to improve the driving conditions of the engine 1.

For example, the ECU 15 controls the fuel injection time (the fuel injection volume) of an injector 37 (refer to FIG. 1) based on the engine speed, engine load and intake air volume and corrects the ignition timing based on a signal from the knock sensor 32 (refer to FIG. 6). In addition, when the drive area enters a surge area based on a corrected amount of the ignition timing, the EUC 15 allows the oil pressure control valve 28 to control such that hydraulic fluid is supplied to the retard chamber 31 so as to retard the phase angle of the intake valve 6.

In addition, the ECU 15 adds up a running time of a vehicle based on an added up value of time spent running from the start of the drive of the vehicle to the standstill thereof by an interior counter and operates a mileage of the vehicle based on the vehicle speed based on the number of revolutions of an output shaft (not shown) of a transmission detected by a vehicle speed sensor (not shown) and the running time so added up.

Then, the ECU 15 obtains the working rotation frequency of the vane 29 for the running time or the mileage and estimates the degree of deterioration of hydraulic fluid based on at least one of the working rotation frequency, the running time and the mileage. Of course, maps of the working rotation frequency of the vane 29, the running time and the mileage which are used to determine the degree of deterioration of hydraulic may be stored in a memory (not shown) in advance so that the maps are retrieved by an actual working rotation frequency, the running time and the mileage to thereby detect the degree of deterioration of hydraulic fluid.

Figure 8:
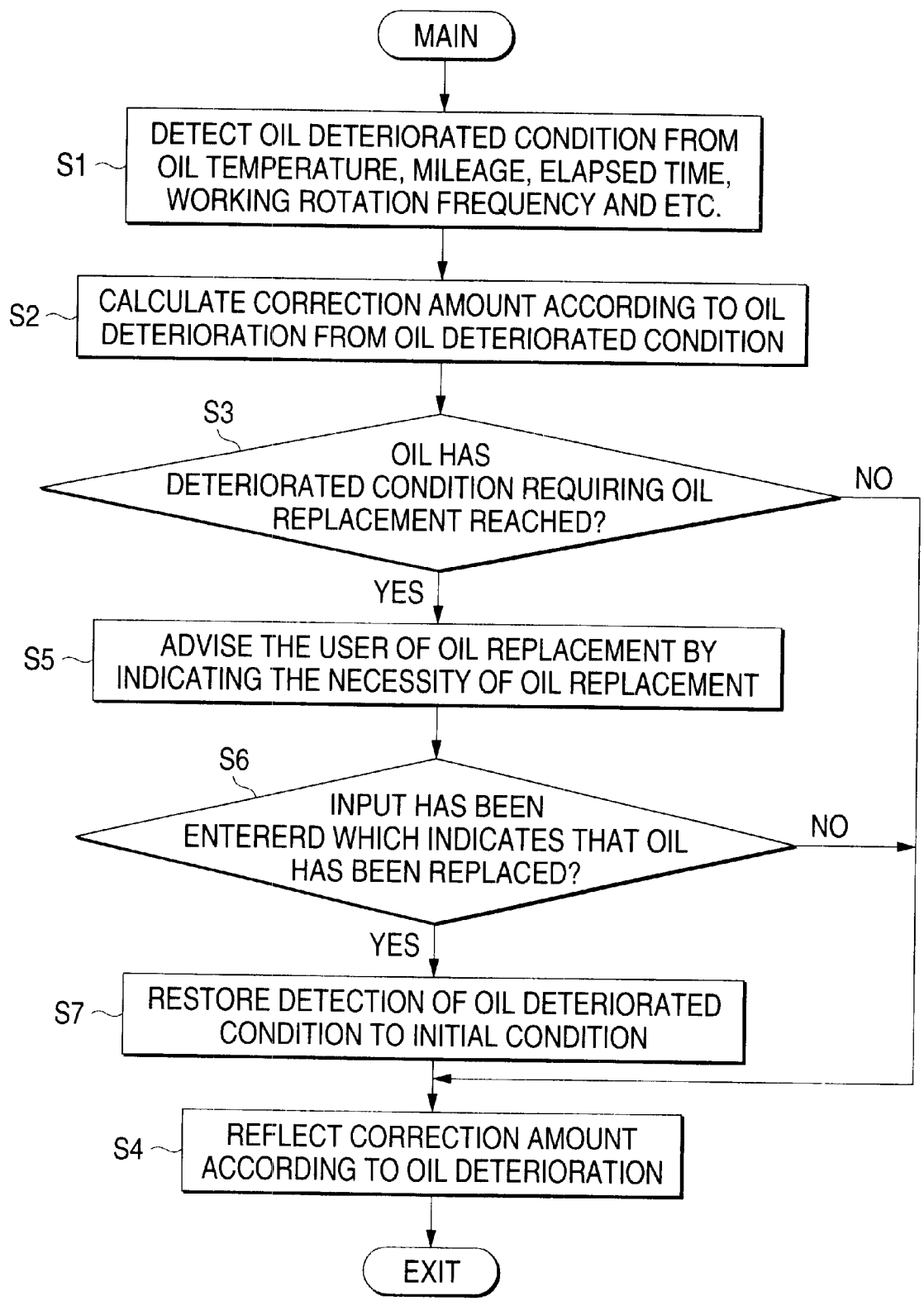
FIG. 8 is a flowchart illustrating a learning routine for dealing with deterioration of hydraulic fluid according to an embodiment of the invention, which corresponds to a first aspect of the invention.

FIG. 8 shows a learning routine for deterioration of hydraulic fluid which corresponds to the first aspect of the invention.

As shown therein, the ECU 15 detects the degree of deterioration of hydraulic fluid such as a change in the viscosity of the hydraulic fluid based on at least one of an oil temperature (the temperature of hydraulic fluid) detected by the oil temperature sensor 42 (the deterioration detecting unit), the mileage of the vehicle, an elapsed time (the running time of the vehicle) and the working rotation frequency of the vane 29 (S1), and then calculates a correction amount by multiplying the output duty ratio of the oil pressure control valve 28 by a correction factor (a correction value) for reflecting the degree of deterioration of the hydraulic fluid(S2).

Next, a comparison value corresponding to an oil replacement timing is compared with the calculated correction amount to determine whether or not the deterioration of oil has reached a deterioration state which requires an oil replacement, i.e., whether or not oil needs to be replaced (S3).

In the event that the correction value is less than the comparison value corresponding to the oil replacement timing, the flow moves to step S4, where the output duty ratio (the output control value) of the oil pressure control valve 28 (refer to FIG. 6) is corrected such that the correction amount equals to the calculated correction value, and the oil pressure control valve 28 is operated with this corrected output duty ratio so as to reflect a correction amount which is in accordance with the degree of deterioration of the oil (S4).

In the event that the correction amount calculated at step S2 exceeds the comparison value requiring an oil replacement, an indication signal is outputted to an oil replacement indicator (for example, a warning lamp 43) which is designed to make the user attempt to perform a required oil replacement, whereby the user is advised of the required oil replacement (S5).

Thereafter, whether or not the required oil replacement has been implemented is determined through an automatic or manual switch (an oil replacement detecting unit) 44 for detecting whether or not a required oil replacement has been implemented (S6), and in the event that it is determined that the required oil replacement has been carried out, the warning of the user against the oil replacement by the warning lamp 43 is cancelled, and the correction factor is initialized which had been effective until the replacement of oil (S7).

Following this, the initialized correction factor is used just after the required oil replacement has been performed to correct the output duty ratio of the oil pressure control valve 28. As a result, the degree of deterioration of the hydraulic fluid can be reflected properly, whereby the VTC 27 can operate properly.

In this case, the VTC 27 including the oil pump, the oil pressure control valve 28, the advance chamber 30 and the retard chamber 31 has been run in, and when the correction factor obtained after the vehicle has been run in is used as the correction factor to be used just after the required oil replacement has been implemented, the learning time can be reduced, whereby a control with a high response can be attained.

Figure 9:
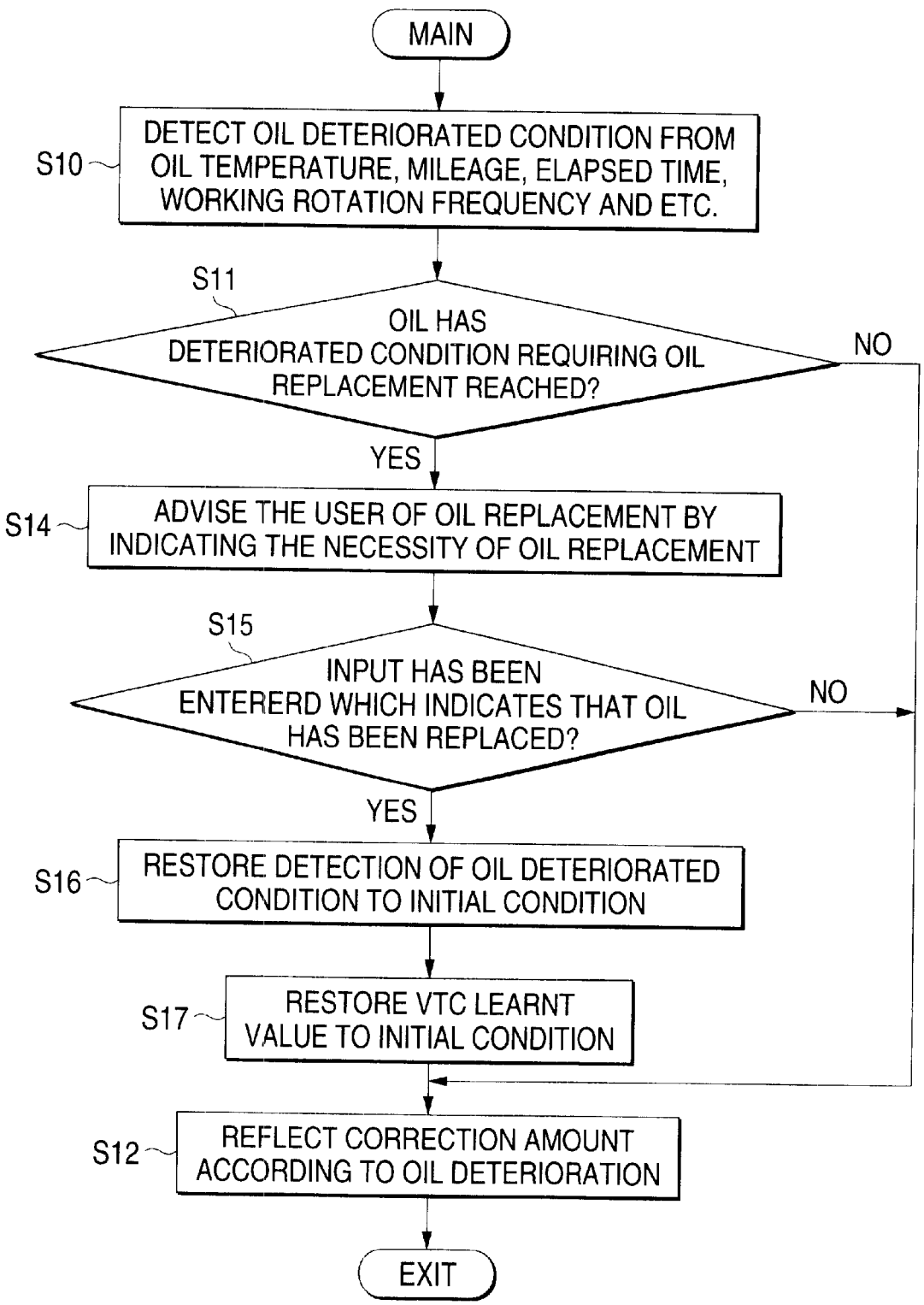
FIG. 9 is a flowchart illustrating a learning routine for dealing with deterioration of hydraulic fluid according to another embodiment of the invention, which corresponds to a second aspect of the invention.

FIG. 9 shows a learning routine for deterioration of hydraulic fluid which corresponds to the second aspect of the invention.

As shown therein, first of all, the ECU 15 detects the degree of deterioration of hydraulic fluid such as a change in the viscosity of the hydraulic fluid based on at least one of an oil temperature (the temperature of hydraulic fluid) detected by the oil temperature sensor 42 (the deterioration detecting unit), the mileage of the vehicle, an elapsed time (the running time of the vehicle) and the working rotation frequency of the vane 29 (S10) and, following this, detects whether or not the degree of deterioration of hydraulic fluid reaches a degree of deterioration which requires a replacement of oil (S1).

Whether or not the degree of deterioration of hydraulic fluid reaches the degree of deterioration which requires an oil replacement is determined by comparing a correction amount obtained by calculating a correction factor (a correction value) for reflecting the degree of deterioration of hydraulic fluid and multiplying the correction factor so calculated with a comparison value requiring an oil replacement.

In the event that the correction amount obtained by the calculation is compared with the correction amount corresponding to an oil replacement to be found that the former is equal to or smaller than the latter, the output duty ratio (hydraulic control value) of the oil pressure control valve 28 is corrected to have the calculated correction amount, and then the oil pressure control valve 28 is actuated with the current output duty ratio (S12)

In the event that the calculated correction factor exceeds the comparison value corresponding to an oil replacement, and next, an oil replacement has been detected by the manual or automatic switch (the oil deterioration detection unit) 44, the user is warned of the requirement of oil replacement by the oil replacement indicator for advising the user of such a required oil replacement such as the warning lamp 43 (S14), and following this, whether or not the hydraulic fluid has been replaced is determined (S15).

Whether of not the oil has been replaced is detected by switching the switch 44, and for example, the switch detects the replacement of oil when switched on.

When the required oil replacement has been carried out a cancellation signal is outputted to the oil replacement indicator for making the user to attempt to replace oil such as the warning lamp 43 so as to cancel the indication, and the correction value corresponding to the output duty ratio (the output control value) of the oil pressure control valve 28 is initialized to restore the initial state, so that the output duty ratio of the oil pressure control valve 28 is corrected with the initial value so obtained (S16), and the correction value which is the result of learning of the oil pressure control valve 28 is restored to the initial state (S17).

Thus, since the degree of deterioration of hydraulic fluid is reflected properly even with this embodiment, the phase angle (the valve timing) is properly controlled by the VTC 27. Of course, in the event that the correction factor obtained just after the vehicle has been run in (for example, when 1000 km is covered as a mileage) is used as the initial value just resulting after the oil replacement has been carried out, the learning time can be reduced, and the response ad reliability in controlling can be improved.

The initial value obtained by initializing the correction value can be used not only for adjusting only the phase angle of the intake camshaft 17 but also for adjusting only the phase angle of the exhaust camshaft 18 and for adjusting the phase angles of both the intake camshaft 17 and the exhaust camshaft 18. In particular, in the event that correction values for control oil pressure values of the oil pressure control unit such as the oil pressure control vale 28 for a plurality of phase angle adjusting unit such as the VTC 27 are designed to be initialized all together so that preset initial values can be used, the reliability in controlling the engine can be increased drastically. Note that the phase angle adjusting unit includes a unit for altering the phase angles of the intake camshaft 17 and the exhaust camshaft 18 relative to the crankshaft 21 and a unit for altering the magnitude of a cam nose.

Thus, according to the respective learning controls as has been described above, since the hydraulic oil is replaced according to the indication on the deterioration indicating unit such as the warning lamp 43, so that an oil replacement is implemented at a proper timing, not only can the wasteful oil replacement by the used be prevented but also the reduction in response in controlling the phase angle adjusting unit such as the VTC 27 can be prevented. Furthermore, since the correction value adopted as the control oil pressure value by the oil pressure control unit to control the operation of the phase angle adjusting unit is initialized just after the oil replacement has been implemented as required, so that a preset initial value can be used, the phase angle adjusting unit can be operated properly.

Thus, according to the invention, the following advantages can be provided:

Even when oil is replaced by the user on his or her own, the phase angle adjusting unit can be operated properly (the first and second aspects of the invention)

Furthermore, since the user is advised of an oil replacement, the wasteful replacement of hydraulic fluid can be prevented (the first and second aspects of the invention); and Not only can the phase angle adjusting unit be operated properly but also the response and reliability in controlling the phase angle adjusting unit can be increased as much as possible (the first aspect of the invention).

While only certain embodiments of the invention have been specifically described herein, it will apparent that numerous modification may be made thereto without departing from the spirit and scope of the invention.

What is claimed is:

1. A variable valve-timing engine comprising:

a phase angle adjusting unit for adjusting a relative phase angle of an exhaust cam for opening and closing an exhaust valve and an intake cam for opening and closing an intake valve;

an oil pressure controlling unit for controlling the operation of said phase angle adjusting unit through the oil pressure of hydraulic fluid;

a correcting unit for correcting a control oil pressure value adopted by said oil pressure controlling unit to control the operation of said phase angle adjusting unit based on the degree of deterioration of said hydraulic fluid; and an oil replacement detection unit for detecting the replacement of said hydraulic fluid, wherein said correcting unit initializes a correction value for a control oil pressure value adopted by said oil pressure controlling unit to control the operation of said phase angle controlling unit immediately after an oil replacement has been implemented, so that a preset initial value can be used.

2. The variable valve-timing engine as set forth in claim 1, wherein said initial value is a correction value adopted after said oil pressure controlling unit and said phase angle adjusting unit have been run in.

3. The variable valve-timing engine as set forth in claim 1, wherein the degree of deterioration of said hydraulic fluid is detected based on at least one of a temperature of said hydraulic fluid, a mileage of a vehicle, a running time of the vehicle and a working rotation frequency of a rotator provided in said phase angle adjusting unit.

4. A variable valve-timing engine comprising:

a phase angle adjusting unit for adjusting a relative phase angle of an exhaust cam for opening and closing an exhaust valve and an intake cam for opening and closing an intake valve;

an oil pressure controlling unit for controlling the operation of said phase angle adjusting unit through the oil pressure of hydraulic fluid;

a correcting unit for correcting a control oil pressure value adopted by said oil pressure controlling unit to control the operation of said phase angle adjusting unit based on the degree of deterioration of said hydraulic fluid;

an oil replacement detection unit for detecting the replacement of said hydraulic fluid; and a deterioration indicating unit for indicating the replacement of said hydraulic fluid, wherein said correcting unit initializes a correction value for a control oil pressure value adopted by said oil pressure controlling unit to control the operation of said phase angle controlling unit immediately after an oil replacement has been implemented, so that a preset initial value can be used.

5. A variable valve-timing engine as set forth in claim 4, wherein said initial value is a correction value adopted after said oil pressure controlling unit and said phase angle adjusting unit have been run in.

6. The variable valve-timing engine as set forth in claim 4, wherein the degree of deterioration of said hydraulic fluid is detected based on at least one of a temperature of said hydraulic fluid, a mileage of a vehicle, a running time of the vehicle and a working rotation frequency of a rotator provided in said phase angle adjusting unit.

7. An oil replacement detecting apparatus comprising:

a variable valve-timing engine including an exhaust camshaft having an exhaust cam for opening and closing an exhaust valve and an intake camshaft having an intake cam for opening and closing an intake valve;

a phase angle adjusting unit having at least one vane secured to at least one of said exhaust camshaft and said intake camshaft, for adjusting a relative phase angle of said exhaust cam and said intake cam;

an oil pressure controlling unit for controlling the operation of said vane of said phase angle adjusting unit through the oil pressure of hydraulic fluid;

a deterioration detecting unit for detecting the degree of deterioration of said hydraulic fluid;

a correcting unit for correcting a control oil pressure value adopted by said oil pressure controlling unit to control the operation of said phase angle adjusting unit based on the degree of deterioration of said hydraulic fluid;

an oil replacement detection unit for detecting the replacement of said hydraulic fluid; and a deterioration indicating unit for indicating the replacement of said hydraulic fluid.

8. The oil replacement detecting apparatus as set forth in claim 7, wherein said deterioration detecting unit detects the degree of deterioration of said hydraulic fluid based on at least one of a temperature of said hydraulic fluid, a mileage of a vehicle, a running time of the vehicle and a working rotation frequency of said vane of said phase angle adjusting unit.

* * * * *